July 14, 1970            R. E. MEADE            3,520,066

SPRAY DRYING METHOD

Filed May 26, 1966

```
┌─────────────────────────┐                    ┌─────────────────────┐
│ A LIQUID CONTAINING     │                    │ DRYING ATMOSPHERE   │
│ SOLIDS                  │                    └─────────────────────┘
└─────────────────────────┘                         ↘ FOR EXAMPLE-
      ↘ FOR EXAMPLE-                                  AIR HEATED
        MILK, FRUIT & VEGETABLE JUICES,               TO 180° F
        CHEMICAL SOLUTIONS, ETC.
      ↓
┌─────────────────────────┐
│ SUSPEND DROPLETS IN     │
│ DRYING ATMOSPHERE       │
└─────────────────────────┘
                ↓
┌─────────────────────────────────────────────────────────────────┐
│ ALLOW DROPLETS TO PARTIALLY DRY WHILE ENTRAINED IN DRYING       │
│ ATMOSPHERE                                                      │
└─────────────────────────────────────────────────────────────────┘
                ↓
┌─────────────────────────────────────────────────────────────────┐
│ CAUSE DRYING ATMOSPHERE TO PASS THROUGH A FORAMINOUS MEMBER     │
└─────────────────────────────────────────────────────────────────┘
                ↓
┌─────────────────────────────────────────────────────────────────┐
│ COLLECT THE PARTICLES ON THE FORAMINOUS MEMBER WHILE STILL      │
│ TACKY BUT WITHOUT SUFFICIENT LIQUID TO COALESCE                 │
└─────────────────────────────────────────────────────────────────┘
                ↓
┌─────────────────────────────────────────────────────────────────┐
│ CONTINUE TO FORCE THE DRYING ATMOSPHERE THROUGH THE PARTICLES   │
│ COLLECTED UNTIL SUBSTANTIALLY DRY AGGLOMERATE FORMED IN SITU    │
└─────────────────────────────────────────────────────────────────┘
                ↓
┌─────────────────────────────────────────────────────────────────┐
│ REMOVING THE PARTICLES FROM THE FORAMINOUS MEMBER               │
└─────────────────────────────────────────────────────────────────┘
```

INVENTOR.
REGINALD E. MEADE
BY
ATTORNEY

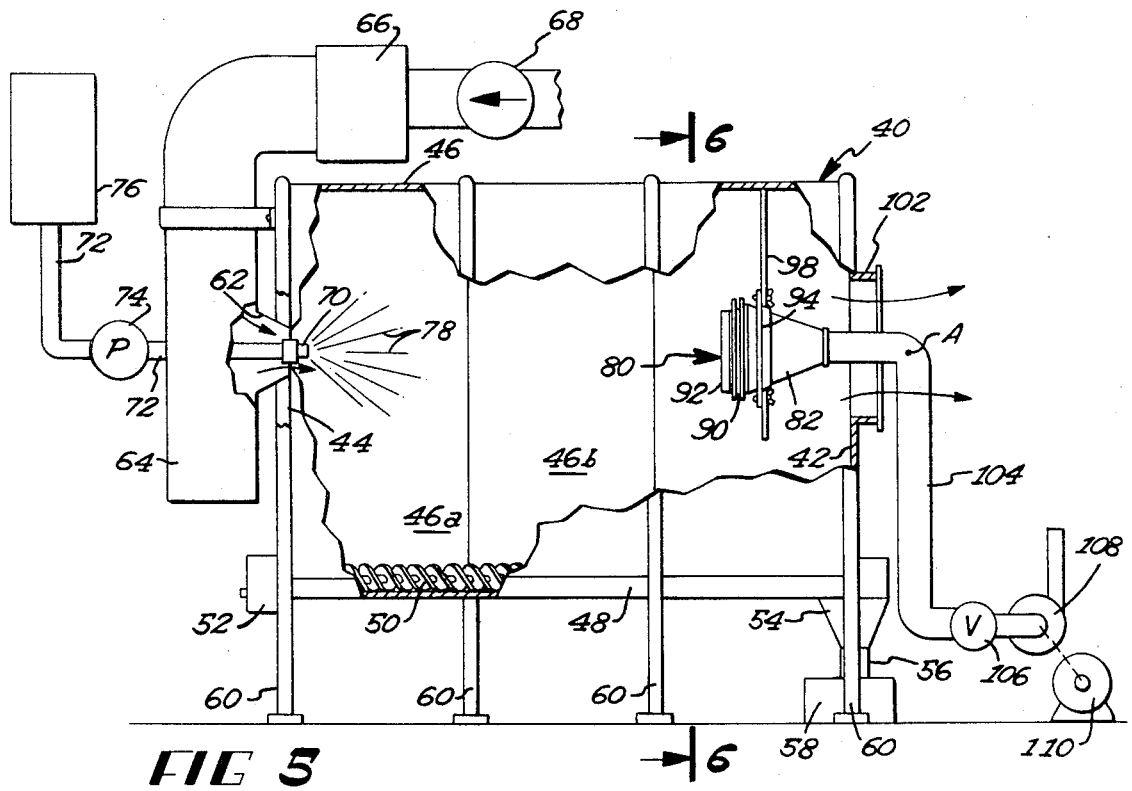
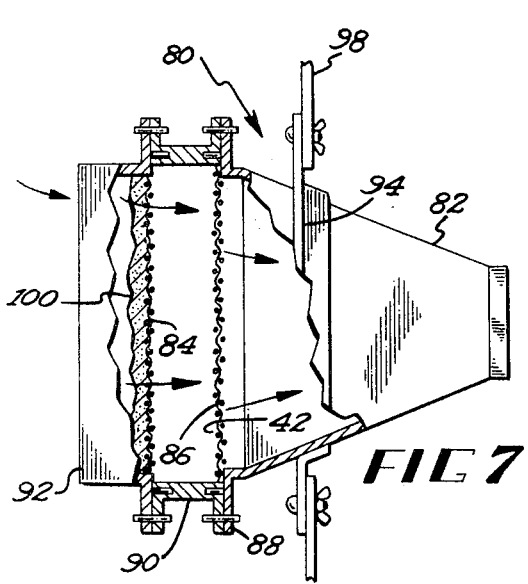
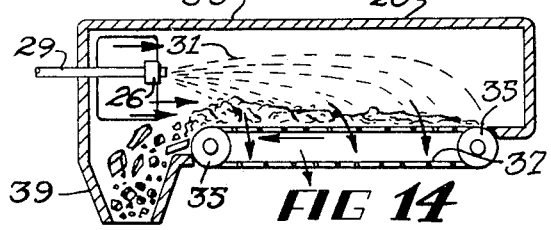
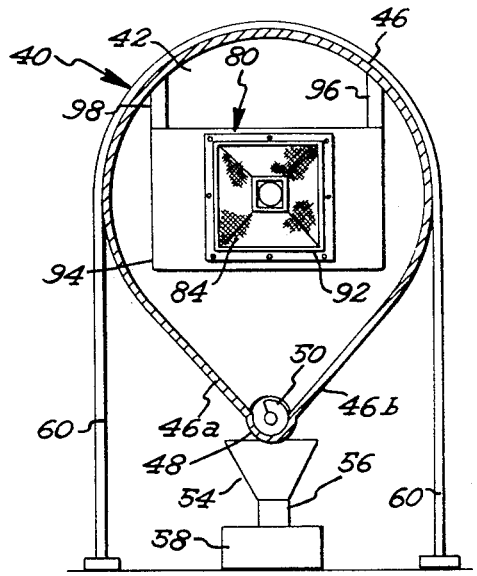

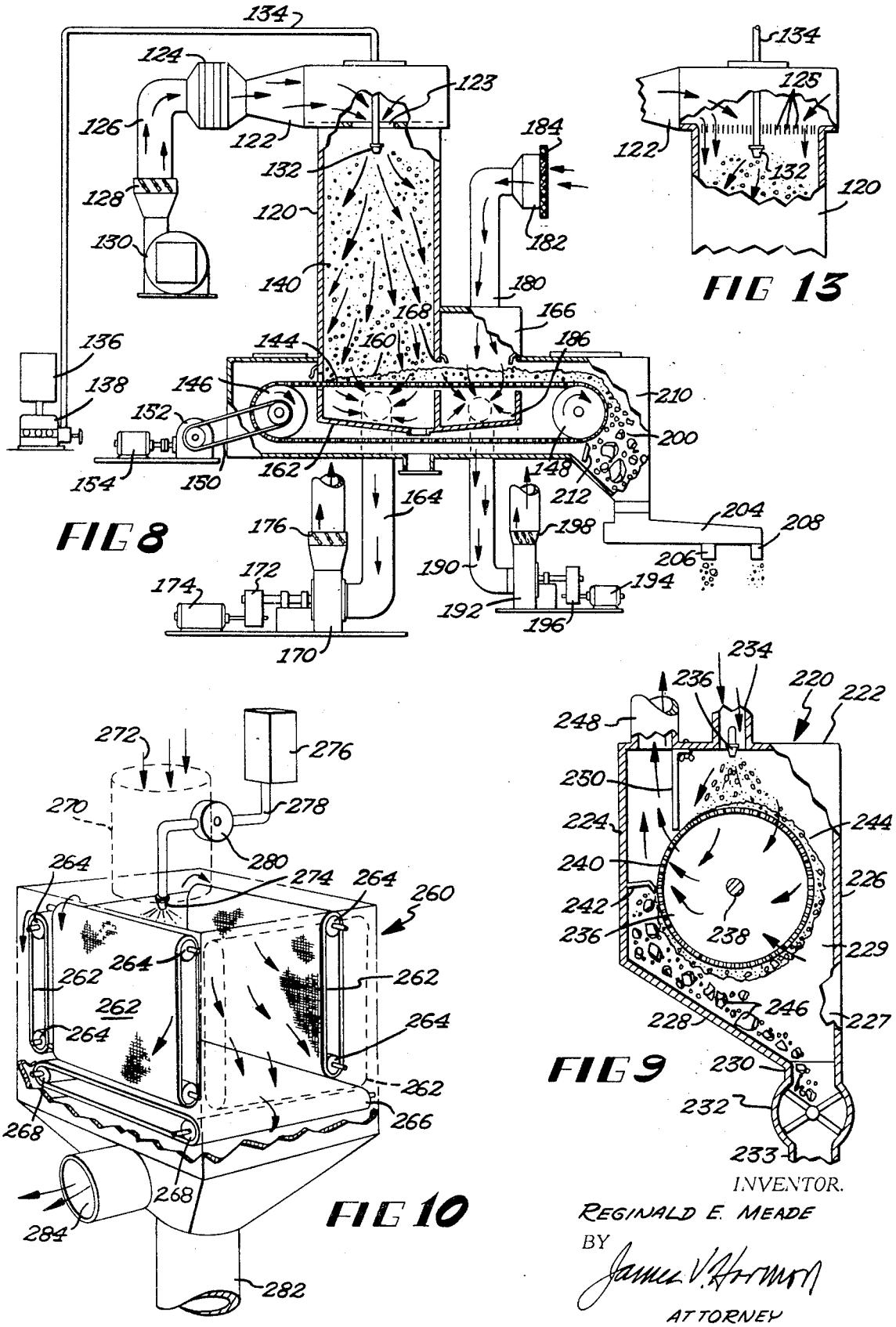

July 14, 1970 R. E. MEADE 3,520,066
SPRAY DRYING METHOD

Filed May 26, 1966 6 Sheets-Sheet 4

INVENTOR.
REGINALD E. MEADE
BY
James V. Harmon
ATTORNEY

July 14, 1970 R. E. MEADE 3,520,066
SPRAY DRYING METHOD

Filed May 26, 1966 6 Sheets-Sheet 5

INVENTOR.
REGINALD E. MEADE
BY
James V. Harmon
ATTORNEY

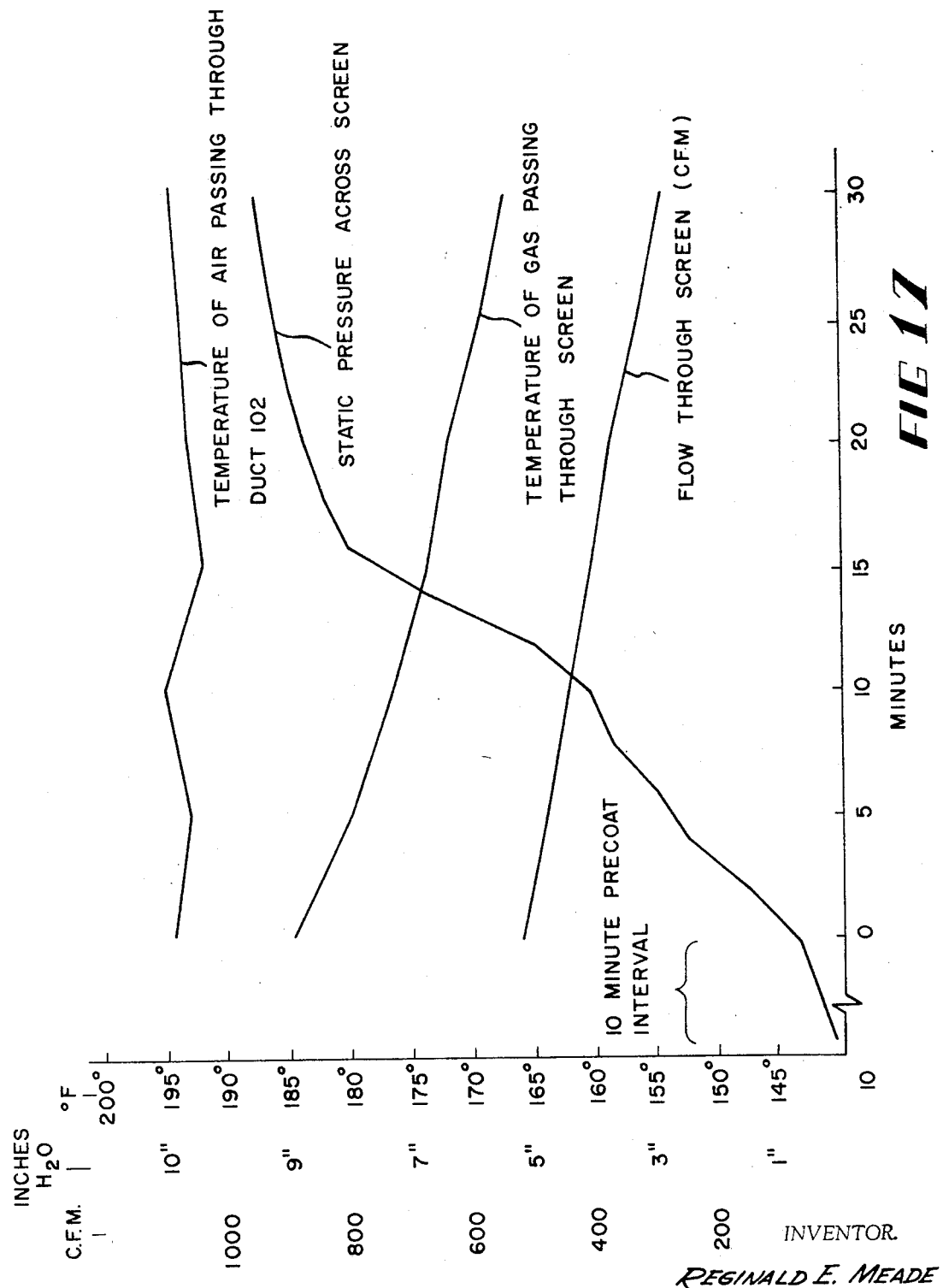

United States Patent Office 3,520,066
Patented July 14, 1970

3,520,066
SPRAY DRYING METHOD
Reginald E. Meade, Stillwater, Minn., assignor to The Pillsbury Company, Minneapolis, Minn., a corporation of Delaware
Filed May 26, 1966, Ser. No. 553,101
Int. Cl. B01d 1/16
U.S. Cl. 34—9
17 Claims

ABSTRACT OF THE DISCLOSURE

A process for drying fluids by spraying into a drying atmosphere, directing the drying atmosphere and dispersed droplets of the fluid toward a perforate collecting screen and allowing the droplets to dry to the point where they are in a tacky condition when they reach the screen. The tacky bodies when they contact one another become bonded together to form a self-supporting porous mat. A portion of the drying atmosphere is passed through the porous mat collected upon the screen to dry it as it forms. The screen (typically an endless conveyor belt) can be used, if desired, to transport the mat into a zone where cool air is forced through it to further rigidify the mat.

---

The present invention relates to the drying of materials and more particularly the drying of solids from a liquid solution or dispersion that is placed in finely divided droplet form and entrained in a gas stream. The invention applies to the drying of particles present in common suspensions, dispersions or colloidal suspensions as well as true solutions. The invention is also useful in agglomerating dried powders.

In the past several decades the drying of materials has been carried out on an ever-increasing scale by spraying liquids that are to be dried into a hot dry stream of gas passing through a drying chamber and collecting the dried solids. This process, frequently referred to as "spray drying," has become particularly widely used in the food industry for drying such products as milk, cream, instant coffee, cocoa, fruit and vegetable juices, extracts and flavorings. A variety of other products such as drugs, detergents, soaps, cosmetics, etc. have also been subjected to the process in other industries. In spite of the success this process has experienced, it has several important disadvantages, limitations and shortcomings.

Product accumulation on the walls of the drying chamber is a major disadvantage. While both vertical and horizontal spraying is used, most spray drying devices in commercial use employ either a cylindrical or rectangular drying chamber with the spray nozzle positioned to direct the sprayed material vertically either upwardly or downwardly through the chamber in a manner specifically designed to prevent material from contacting and being deposited upon the walls. In spite of these efforts, the unintentional deposition of materials on the walls of the chambers has remained a problem, particularly with products having low melting points and sensitivity to heat.

Resulting from the accumulation of material, is the necessity for interrupting the drying operation so that a workman can enter the drying tank and manually scrape the walls. This operation is not only a time-consuming and unpleasant task but an expensive procedure and one which increases the opportunity for contaminating a product, a factor which is particularly objectionable in the case of foods and pharmaceuticals. Moreover, even after the tank has been scraped, the residual material remaining on the walls of the tank can produce a sanitation problem and produce off flavors in food products. In the case of chemical products, it is often undesirable to expose persons to the material being processed.

The tendency of materials to accumulate has also limited the application of spray drying in general to those materials which either have high melting points or in which heat damage can be tolerated.

Another disadvantage of prior spray drying processes is that they characteristically release a substantial amount of dust into the atmosphere or in the alternative require an elaborate dust collecting apparatus such as a cyclone or textile bag filter frequently larger than the drying apparatus itself.

Moreover, the texture of the product produced in conventional spray drying varies to some extent; that is to say, the product lacks uniform consistency, some parts being hard, dense and brittle while others may be a fine loose dust. In some areas of the drying chamber where the product accumulates in corners, very hard or even crystalline masses can be formed whereas in other areas relatively losely packed powdered materials will accumulate.

Still another shortcoming of a conventional spray dryer is the loss of heat which is experienced. While a portion of the lost heat is carried away in the particles of solid material escaping from the dryer, an additional amount is also lost because there is insufficient contact time to bring about saturation of the drying atmosphere.

Still another shortcoming of the prior art is the fact that air entrained droplets of differing sizes and moisture content are all subjected to the same drying conditions and exposed to generally the same volume of drying air. Accordingly, the larger droplets which have a relatively high moisture content tend to be incompletely dried which is, of course, undesirable.

A variety of other drying systems previously proposed have been either costly or largely ineffective in eliminating the aforesaid problems and accordingly have not been widely used.

In view of the deficiencies of the prior art, it is the general object of the invention to provide novel dehydrated products, method and apparatus for dehydration characterized by wide applicability as to products, low damage to product quality, low product loss and low end product moisture.

It is another object of the present invention to provide an improved spray drying process wherein the loss of material in the form of dust escaping through exhaust vents is very substantially reduced.

Yet another object of the present invention is the provision of an improved method of spray drying wherein the formation of hard, difficult-to-remove and hetrogeneous cakes of dried material upon the walls of the drying chamber and the resulting variations in physical properties of the finished dried material is materially reduced.

A further more general object of the invention is the provision of an improved spray drying apparatus which can be operated continuously for long periods of time without the requirement for scraping and cleaning the walls of the drying chamber.

Another object of the present invention is to provide an improved spray drying process for providing highly porous agglomerates adapted to be subdivided into pieces of a predetermined size having instant wetting properties when added to a liquid.

Another object is to provide an apparatus of the type described which requires relatively little floor space, can be economically constructed and has a reduced height in comparison to many prior spray drying devices.

A further object is to provide a spray drying process having a higher thermal efficiency and relatively high rate of heat transfer during the falling rate drying phase.

A further object of the invention is to provide an improved spray dried product of a uniform consistency.

Still a further object of the present invention is to provide an improved spray drying process wherein heat degradation of the finished product can be reduced through the control of the time period during which the product is exposed to heat and by the further provision for quickly removing the product from contact with the heated drying gas and promptly exposing the product to a cooling gas until the product reaches a stable condition.

These and other more detailed and specific objects will be apparent in view of the following specification and attached drawings wherein.

FIG. 1 is a flow chart showing the steps performed in a preferred embodiment of the invention.

FIG. 2 is a diagram illustrating the method employed in accordance with one embodiment of the invention.

FIG. 3 is a diagram illustrating the appearance of a piece of spray dried material after being removed from the screen of FIG. 2.

FIG. 4 is a perspective view showing the appearance of another type of spray dried material after being removed from the screen of FIG. 2.

FIG. 5 is a side elevational view partially broken away of an apparatus employed for carrying out the present invention.

FIG. 6 is a transverse sectional view taken on line 6—6 of FIG. 5.

FIG. 7 is a greatly enlarged side elevational view of the collecting screen housing partly broken away.

FIG. 8 is a side elevational view of another embodiment of the invention partly broken away.

FIG. 9 is a side elevational view partly in section of still another embodiment of the invention.

FIG. 10 is a side elevational view of yet another embodiment of the invention.

FIG. 13 is a partial side elevational view of the upper portion of the spray dryer of FIG. 8 showing the modified form of air flow control means.

FIG. 14 is a semi-diagrammatic vertical longitudinal sectional view of another form of apparatus embodying the invention.

FIG. 17 is a graph illustrating changes in processing conditions in connection with Example IV.

Figure 11:
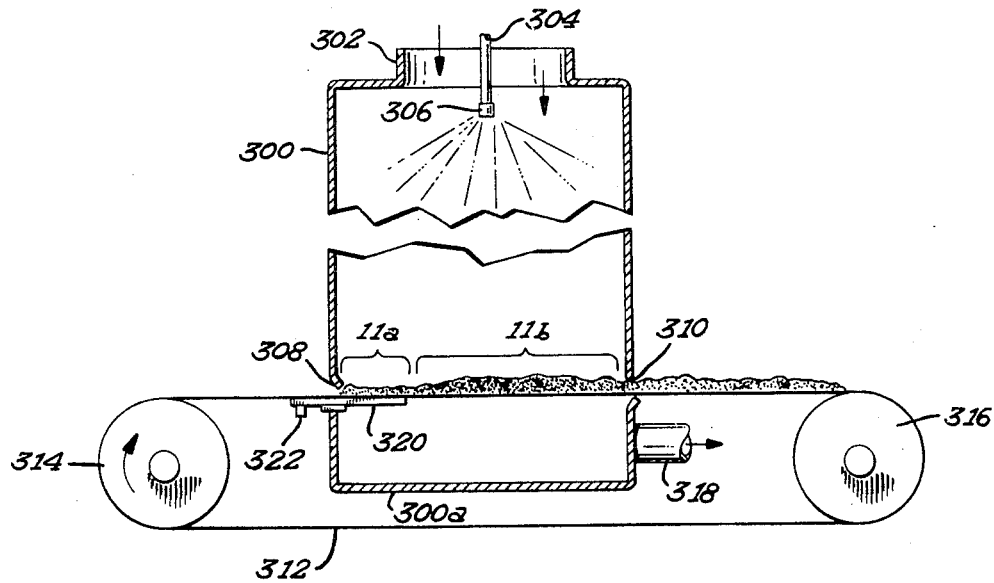
FIG. 11 is a semi-diagrammatic side elevational view of a modified form of a dryer in accordance with the invention including a provision for pre-coating the collection screen.

I have discovered that the foregoing objects and advantages of the present invention can be accomplished by employing a process which will now be briefly described with reference to FIG. 1.

The process is begun with a fluid to be dried which is composed of a liquid containing a solid material either dissolved or suspended therein as a starting material. Examples of such starting materials are vegetable and fruit juices, milk, chemical solutions such as aqueous or non-polar solutions of any of a variety of materials, such as pure elements, salts, resinous materials and in general a solution, slurry or suspension of any material which is to be dried by the removal of a solvent or suspending liquid. An additional starting agency comprises a gaseous drying atmosphere. The drying atmosphere will normally consist of air heated substantially above room temperature or of air having a relatively low humidity level or of heated relatively low humidity air. The moisture present in the drying atmosphere is substantially below its saturation point. (The term "drying atmosphere" as used herein is intended to mean a gas at such conditions of temperature, pressure and vapor content as to be capable of absorbing a substantial quantity of liquid from the fluid to be dried.)

As a first step in the operation, the fluid to be dried is dispersed into the drying atmosphere as droplets small enough to that the liquid component of the fluid droplets will be readily evaporated. For most practical applications of the invention, it is preferred that the droplets be comparable to those produced in commercially available spray dryers. Generally, the smaller the diameter of the droplets, other things remaining equal, the more rapidly will moisture be removed.

Next, the drying atmosphere together with the entrained droplets (from which moisture is being removed) is directed toward a foraminous collecting member. While the surfaces of the particles are still in a tacky condition, but do not contain sufficient liquid to enable them to coalesce and form a relatively impermeable continuous material, the drying atmosphere passes through the foraminous member and the suspended particulate material is collected upon the foraminous member and upon the particulate material previously collected or upon both.

By the term "coalesce" as used herein I mean a flowing or fusing together of the particles to form a relatively solid or continuous less permeable material in which the individual particles cannot be clearly recognized without magnification and wherein the spaces or interstices between them are relatively small (if present at all) compared with the size of the particles.

The particles are thus brought together so as to contact one another while the surfaces thereof are in a tacky condition and bonds are formed at the points of contact between the particles to produce relatively highly porous lacy reticulum in which a substantial portion of the agglomerate thus formed consists of communicating spaces or pores between the contacting and bonded particles.

The ability of the particles to form bonds (fuse) will depend, of course, upon the nature of the product itself but in addition will depend largely upon two other operating conditions—the temperature of the particles at the time they strike the surface of the accumulated material and their moisture content. Thus, at a constant temperature greater moisture contents will promote greater fusion. In the case of many products, below a particular moisture content fusion may be adequate. In general, as the temperature is increased, fusion will take place with less moisture being required. It should be understood that these general statements will be subject to variation in the case of individual products.

During the drying operation, as the droplets pass through the dryer, the temperature of each droplet will be limited by its moisture content and by the wet bulb temperature of the drying gas which, in a typical case, for example, may be between 125° F. and 130° F.

The phenomena taking place during the falling rate phase will now be described. Once the particles have been deposited on the collection screen, a sudden change will take place in the relation between the particles and the surrounding air. The air will then begin to stream over and around the particles and through the minute microporous interstices between the particles in the agglomerate. As this streaming takes place, moisture removal from the particles will occur at a much higher rate. Removal of the last traces of removable moisture proceeds at a characteristically low rate. This is commonly referred to as the "falling rate drying period." In accordance with the present invention, after the movement of the particles has been arrested by deposition on the bed or screen, a substantial increase in the velocity of the drying gas relative to the particles is established. This provides a more effective means for removing the last traces of removable moisture than is attained during the falling rate phase in a drying process of the type in which the particles are entrained in the drying gas and thus moving at substantially lower velocity relative to the particles.

The flow of drying atmosphere through the bonded particles continues until the remaining moisture or other liquid present on the surface of the particles is removed and the particles are thereby firmly bonded to one another at their points of contact. In this way a deposit of bonded particles builds up upon the foraminous member with the drying atmosphere passing through the deposit to dry it and the particles which have been deposited upon the foraminous member serving as a means for collecting freshly deposited particles. When the spraying operation is finished and the accretion of material on the foraminous member is dried to the desired moisture content, it can be removed from the screen in any suitable manner.

I have found quite surprisingly that the particles do not pass through the foraminous member but instead accumulate in a porous, self-supporting mat. The mat includes side, upper and lower surfaces and is relatively large in size compared with the particles of which it is composed and the pores between the particles communicate with each other to form channels that extend from the upper or influent to the lower or effluent surface of the mat. The lower surface is positioned adjacent to the foraminous collecting member. The mat in general has both a width and breadth of at least several inches, e.f. from 2–3 inches. The thickness of the mat should be at least the combined thickness of a multiplicity of dried particles but will often be several inches in thickness. Drying in this manner has a number of highly unique and advantageous benefits. The primary benefits are: First, filtration of air-entrained particles from the drying medium is accomplished by those particles already deposited in the mat. Thus, reducing and in some cases eliminating the need for auxiliary filters in the stream of exit drying gas. Since this phenomenon in the course of a drying operation has heretofore been unknown, it will be referred to as "autofiltration." Second, greater drying efficiencies can be achieved than was heretofore possible. While the precise reason for this result is not known with certainty, it is believed to be, in part, due to the accelerated evaporation due to the streaming of the drying medium around and through the particles having been deposited in the mat and, in part, to the increased driving forces across the solid and gaseous interface. Third, greater product dryness is accomplished with the process of the invention because of the increased time of exposure of the material to the drying atmosphere. Fourth the invention is capable of drastically reducing the undesired accumulation of the product on the walls of the dryer. This allows the application of the present process to products which were heretofore difficult or impossible to dry by conventional spray drying techniques or for that matter, by any previous drying process of which I am aware. It also increases the product quality because of the reduction of heat damage. Fifth, the product that is being dried is placed, while in a practically dried state, in a form which can be transferred from the drying zone to one or more additional zones where further treatment may be performed. Sixth, the process of the invention places the product in a novel physical form (a porous, self-supporting mat which can be further processed if desired to provide products having advantageous properties).

Refer now to FIGS. 2, 3 and 4. In FIG. 2 is shown a stationary enclosure or vessel 20 which in this instance forms a portion of a horizontally disposed duct. A gaseous suspending medium such as heated air 22 is forced through the duct from left to right and through a screen 24 which is supported to extend over the entire cross section of vessel 20 so that all of the heated air 22 must pass through it. Upstream of the screen 24 is a nozzle 26 for producing a spray 28 of the fluid material that is to be dried. The material being dried collects as a highly porous mat or agglomerate 30.

The thickness of this deposit upon the screen will vary. I have found that when a vertical stationary screen is employed, the thickness of the material deposited on the lower end of the screen is sometimes much greater than at the top. For example, the thickness of the material deposited in one instance on a vertical screen was ½ inch thick at the top and three inches thick at the bottom.

The appearance of the agglomerate 30 formed on the screen 24 is shown in FIGS. 3 and 4. The surface **30*a* which is positioned adjacent to the screen 24 bears the configuration of the screen surface. If the material is relatively tacky at the time it was deposited, marked striations and channels 30*b* normal to the surface 30*a*** as shown in FIG. 4 will be present. If the material contains less moisture or is only slightly tacky it will have the irregular surface with no visible striations or markings as shown in FIG. 3.

Reference will now be made to the important process variables. First, any one or several of a variety of liquids containing a solid material can be employed. While the liquid will ordinarily consist of water, it can also comprise a non-polar liquid such as an organic solvent. Where the material being dried consists of a food product such as a bakery mix product, a vegetable fruit juice or milk or dairy product, the suspending liquid will ordinarily be water. Where chemical materials are being dried, a non-polar organic solvent such as a hydrocarbon liquid or other petroleum derivative, aldehyde, ketone or other solvent known to the art can be employed.

The solid material contained in the liquid can comprise any of a variety of particulated insoluble or soluble materials capable of being dried. They can comprise, for example, dissolved solids present as a true solution as well as colloidal and non-colloidal suspensions of insoluble material. The term "solids" as used herein also includes suspended materials which sometimes exist as a liquid, for example, fat in the case of diary products.

The solid material being dried can consist of a single chemically pure material or a mixture. It must, however, include as a component a non-volatile material which is rendered tacky or adherent at some point during the removal of liquid. This will, of course, include materials which are not normally considered tacky in the sense that they have finger tack. The term "tacky" as used herein means capable of forming adhesive connections between particles of sufficient strength to hold a mass of material together to provide a porous medium permitting passage of gas.

The drying atmosphere will normally consist of heated air having a relatively low moisture content but it can also consist of other gases such as nitrogen, carbon dioxide, water vapor or the like. If organic solvents are employed for suspending the solids, an inert atmosphere will be preferred to prevent hazardous operation. As to temperature of the drying atmosphere, any suitable temperature may be used. In general, the drying temperatures of prior art spray drying may be used. The temperature of the air must be high enough to enable the drying atmosphere to hold a substantial quantity of the liquid or solvent being evaporated but should not on the other hand be so high that it will cause a chemical degradation or decomposition of the materials being dried. Moreover, it must not be so high as to melt the dried material that accumulates upon the foraminous collecting member. For example, the temperature can range up to 1000° F. In the case of food materials, the usual range is from about 100° F. to about 500° F.

In some forms of the invention described hereinbelow, more than one drying atmosphere can be employed. A first relatively high temperature gas to quickly evaporate the moisture or other solvent present in the product that is to be dried and a second or more relatively cool gas for quickly removing residual heat from the material accumulated upon the collecting screen to remove any soft deformable or plastic character from the deposit on the screen and convert it to a relatively hard brittle and friable product which can be handled without sticking to the exposed parts of the equipment which it contacts. In this manner, residual surface tack if it exists is removed and the product is converted to a relatively stable material which can be easily handled.

The foraminous collecting member has openings which will in most instances be many times larger in diameter than the particles themselves. Thus, for example, in spray drying foods, a wire screen having sixteen to several hundred openings per square inch can be suitably employed. As the initial material passes through the drying apparatus when operation is commenced only a fraction will be deposited upon the wires of which the screen is composed. The material will quickly begin to build up as a deposit upon the wires of the screen until the original openings within the screen are entirely closed. As this takes place, the material deposited upon the screen acts as its own collecting and supporting medium.

It is important that the surfaces of the particles are tacky at the time they strike the screen or surface of the deposited material. If they are entirely dried and exhibit no tackiness, they will either pass entirely through the screen or will tend to pack the screen and block substantially all flow of drying atmosphere through the screen which is, of course, undesirable. I have discovered that if the surfaces of the particles remain tacky when brought into contact with one another on the surface of the foraminous collecting screen, they will become bonded to one another in a relatively open network and will provide sufficiently large spaces between themselves to permit a satisfactory rate of flow of gas through the screen and agglomerate. On the other hand, liquid should not be present in sufficient quantity so that the particles tend to coalesce and flow from the screen or form a substantially solid mass thereon. The tack of the particles depends upon several factors including the nature of the product, the amount of initial moisture present, the pressure, temperature and vapor content of the drying atmosphere, the spray particle size, concentration and the distance of the nozzle from the collecting screen. Variation in results can be controlled by moving the nozzle toward or away from the screen.

Refer now to FIGS. 5, 6 and 7 which illustrate one form of drying apparatus in accordance with the invention. As shown in the figures, there is provided a drying chamber or vessel 40 including front and rear walls 42 and 44 and side walls 46 which are generally cylindrical but include a downwardly and centrally inclined wall portions **46*a* and 46*b* connected by a hemispherical trough 48 within which is mounted an auger 50 driven by means of a suitable motor 52. The auger 50 when rotated in the proper direction will convey dried material that falls to the bottom of the apparatus toward the right as seen in FIG. 5 to a collecting hopper 54 which is connected by means of a duct 56 to a storage container 58. The auger 50 is provided for collecting any of a material which is deposited upon the walls of the vessel 40 and which thereafter becomes loosened from the walls and falls down the inclined surfaces 46*a* and 46*b*. A portion of the material will be collected on the foraminous collecting means described below. The vessel 40 can be supported in any suitable manner as by means of tubular supporting frame members 60 connected in any suitable manner such as by welding to the chamber 40**.

In the wall 44 is provided a drying gas inlet duct 62 which communicates with a duct 64 that extends vertically and communicates with the outlet of an air heater 66 of any suitable known construction such as a gas burner. Air is supplied to the burner 66 from the atmosphere by means of a blower 68. Positioned concentrically within the air supply duct 62 is a spray nozzle 70 that communicates through a line 72 with a pump 74 which supplies the fluid to be dried from a supply tank 76. The fluid material being dried emerges from the nozzle 70 in the form of a fine spray 78. The sprayed particles are carried in the heated drying gas from left to right as seen in FIG. 5 toward a collecting device indicated generally at 80 which will now be described.

The collecting device 80, as shown in FIG. 7, comprises a tapered duct or funnel 82 and a pair of wire collecting screens 84 and 86 extending across funnel 82 in parallel spaced relationship. The screens 84 and 86 can be supported in any convenient manner but I have found that they will be suitably held in positoin by mounting screen 86 between the outward end of the funnel 88 and a square spacer 90 and the screen 84 between the spacer 90 and a short duct section 92. Bolts or other suitable fasteners can be used to secure the duct section 92 to the spacer 90 and the spacer 90 in turn to the outward end of the funnel 82. The entire collecting apparatus 80 is mounted upon a baffle 94 which is supported from the upper end of the vessel 40 upon brackets 96 and 98.

As shown in FIG. 7, a mat 100 of the type described hereinabove will form on the outward or central surface of the primary collecting screen 84. Screen 86 is not essential for proper operation but is included as a back-up screen for starting. The mat 100 will be highly porous and will contain channels that extend from the interior of the vessel 40 to the interior of the funnel 82 thereby allowing a substantial portion of the heated drying gas passing through the inlet 92 to pass through the mat 100 thereby further drying it after it has been deposited. The portion of the drying gas which does not pass through the screen will be exhausted through an outlet 102 (FIG. 5). Generally the exhausted gas passing through the outlet 102 will have a small amount of particulate material entrained in it and will consequently be passed through a suitable filtering mechanism such as a combination of cyclone collector and textile bag filter. Connected to the outlet end of the funnel 82 is a duct 104 to which is secured a flow control valve 106 and an exhaust blower 108 to reduce the pressure within the duct 104 and funnel 82. The exhaust blower 108 can be driven in any suitable manner as by means of a motor 110.

The operation of the apparatus of FIGS. 5, 6 and 7 will now be described. To begin the operation, the heater 66 and blower 68 are started causing heated air to be introduced into the vessel 40 through the inlet duct 62. The liquid to be dried is then admitted through nozzle 70. Simultaneously, the motor 110 is started with the valve 106 in the "open" position thereby causing a reduced pressure condition within the line 104 and funnel 82. This in turn causes a current of heated gas to pass through the screens 84 and 86 as clearly shown in FIG. 7. As the operation of the device continues, a deposit 100 of a porous product will begin to be produced upon the outward or central surface of the screen 84. After the deposit 100 is formed, little if any material will be added to the material 112 deposited on the screen 86 since the mat already formed upon the screen 84 acts as its own filter and thereby effectively removes all entrained particulate material from the stream of air passing through screen 84. However, because the openings in the screen 84 are much larger than the openings between the finely divided air entrained particles striking screen 84, a small amount of material will strike the screen 86 when the operation is started. Thus, as soon as the openings in the screen 84 become covered by the particles of the mat 100 the accretion of material on the screen 86 will be interrupted. In an apparatus of the type described in FIGS. 5, 6 and 7 used for drying a cake mix composition consisting primarily of shortening, fluor and sugar, a screen having sixteen openings to the square inch and having more than 70% open area was employed as a primary screen and another as a secondary or back-up screen having ten openings per square inch was employed. While the primary screen had an accumulation of about 1½ inches of material, the back-up screen had less than ⅛ inch of material deposited upon it and this material was deposited during the first five seconds of running. When sugar is being dried with an air flow of 100–400 f.b.m. through the dryer and an air temperature of 320° F. entering the dryer, I obtained good results by placing the nozzle from about 9 to 10 feet from the screen. At shorter distances 5–6 feet, the particles were wet and tended to coalesce. At greater distances, the particles were insufficiently tacky and tended to pack or pass through the screen.

Refer now to FIG. 8 which illustrates another embodiment of the invention. The apparatus of FIG. 8 comprises a vessel such as a vertically disposed chamber 120 communicating through an inlet port 123 with a supply duct 122 and a heater 124 which in turn communicates through a duct 126 with a damper 128 to which air is supplied by blower 130. Mounted concentrically within the upper end of chamber 120 is a nozzle 132 that communicates through a supply duct 134 with a fluid product which is to be dried. If desired, the fluid travelling through duct 134 may be aerated or any suitable air entrained therein to facilitate the drying operation and reducing the density of the material. The fluid is supplied from a storage tank 136 under pressure by a pump 138. The liquid sprayed from the nozzle 132 is initially present in the form of wet droplets 140. These droplets are entrained in the heated air passing downwardly from the duct 122. As the particles pass downwardly, they strike a moving foraminous element or screen 144 entrained over a pair of horizontally disposed spaced rollers 146 and 148, the former being driven by means of a belt 150 connected to a speed reducer 152 which is in turn operated by means of a belt driven by a motor 154. The belt 150 can comprise a variety of materials such as a woven wire screen or perforated metal sheet. A variety of other collecting elements will be apparent to those skilled in the art.

As clearly shown in the figure, a deposit of material 160 forms on the upward surface of the foraminous belt 150. The air flowing into the chamber 120 from the duct 122 passes through this deposit of material 160 as indicated by arrows into a compartment 162 below the screen and is exhausted through a duct 164. The foraminous screen 144 is moved so that the upper reach thereof travels toward the right as seen in FIG. 8 carrying the accumulated mat on its upward surface into a second chamber 166 through an opening 168 for purposes hereinafter described. The duct 164 is connected to an exhaust blower 170 driven by a speed reducer 172 and motor 174. From the blower 170 the air passes through a suitable damper 176 which like damper 128 can be opened or closed as conditions of operation require. The chamber 166 communicates with an inlet duct 180 which is connected to an air cooler 182 of any suitable known construction. Prior to entering the air cooler 182 the air is passed through a suitable filter 184. On the opposite side of the screen 144 from the chamber 166 is a chamber 186 which communicates with an outlet duct 190 to a blower 192 driven by means of motor 194 and speed reducer 196. Air passing through the blower 192 is exhausted through a damper 198. The foraminous member 144 and the rollers are mounted within a chamber 210. At the lower end of the chamber 210 is provided a doctor knife 212 for scraping any remaining material from the foraminous belt 150 before the belt returns to the inlet end of the chamber 120. The mat may be removed by any other suitable technique such as a blast of air.

During operation, as the foraminous member 144 travels over the roller 148, the agglomerated material breaks into chunks 200 which pass downwardly into a collecting trough 204. A suitable sifter can be provided for separating and grading various desired particle sizes and exhausting them through a pair of ducts 206 and 208 according to size. Any apparatus suitable for comminuting the discharged fragments is employed when desired to reduce the fragments to the desired size.

A slightly modified form of air flow control is shown in FIG. 13. This flow control consists of a grating 125 composed of a plurality of closely spaced parallel vertically disposed fins for establishing a laminar air flow, the turbulence within the chamber 120 will be substantially reduced and the resultant non-uniform accumulation of dried product on the walls of the apparatus will also be reduced. The flow through the foraminous collecting member 144 will also be laminar. It may be seen that my invention makes possible the provision of a spray drying apparatus without constrictions in the air flow between the spray nozzle and the point at which the drying air is withdrawn from the drying chamber.

In accordance with another modified form of the invention, an additional drying agency is employed consisting of a microwave heater of any well-known commercially available kind. The microwave heater is suitably mounted to heat that portion of the mat within either chamber 120 or the chamber 166 of FIG. 8 and assist in removing residual moisture from the mat. As electromagnetic wave energy from the microwave heater is transferred to the water molecules, their increased energy will accelerate evaporation and as soon as the water is converted to the vapor state it is removed by the current of gas such as air passing through the mat from chamber 166 to chamber 186.

Refer now to FIG. 9 which illustrates another embodiment of the invention. As shown in the figure, there is provided a vessel 220 having a top wall 222, side walls 224, 226, 227 and 229, inclined lower wall 228 and outlet duct 230 which communicates with a star valve 232. A drying gas inlet duct 234 is provided at the upward end of the chamber. Within the duct 234 is provided a spray nozzle 236 that communicates with a source of fluid to be dried (not shown). Mounted for rotation within the chamber 220 is a cylindrical collecting drum 236 supported on a shaft 239 which is itself suitably journalled in the walls 227 and 229 and driven by means of a motor (not shown) at a uniform speed in a clockwise direction as seen in FIG. 9. The cylindrical wall of the drum 236 comprises a foraminous member 240 which can consist, for example, of perforated sheet metal. The openings may suitably be ¼ inch in diameter. A doctor blade 242 is mounted within the housing 220 in position to scrape deposited material 244 which has accumulated on the surface of the drum as shown. Material thus scraped from the drum falls downwardly in the form of porous chunks and pieces 246 along the inclined surface 228 into the star valve 232 and are exhausted through the duct 233. On the upper wall 222 is also provided an exhaust duct 248. Extending downwardly between the exhaust duct 248 and the inlet duct 234 is a baffle 250, the lower end of which contacts the upward surface of the drum 240. In this manner, the air passing through the duct 234 must pass through the accretion 244 to the interior of the drum before being exhausted thereby drying the material deposited upon the surface of the drum. The air then passes through the drum section between the doctor blade 242 and the baffle 250 is exhausted through the duct 248.

Refer now to FIG. 10 which shows still another embodiment of the invention. As seen in FIG. 10 there is provided a drying chamber or vessel 260 including imperforate side, top and bottom walls. On each of the walls is mounted a foraminous collecting element each comprising an endless screen entrained over a pair of horizontally disposed vertically spaced rolls 262 and 264. On the bottom of the chamber is provided a similar collection surface comprising an endless screen 266 entrained over horizontally spaced rolls 268. A suitable driving means is provided for turning each pair of rolls in given feed directions. At the upper end of the apparatus is provided an inlet duct 270 for conveying heated air 272 to the upward end of the apparatus. A spray nozzle 274 is provided at the upward end of the chamber 260. The fluid to be dried is supplied to nozzle 274 from a storage container 276 through a duct 278. A metering pump 280 controls the flow of fluid from the storage container 276 to the nozzle 274.

During operation, the air 272 passing through into the chamber 260 flows downwardly and outwardly through each of the screens 262. Material expelled from the nozzle 272 accumulates on the inward surfaces of each of these foraminous collecting members 262. The solid material collecting on the surface of each of the screens either falls from the screens where the screens pass over the rolls or can be removed therefrom by means of a doctor blade (not shown). After being removed, the material falls downwardly and is discharged through a duct 282. The drying air is discharged through a duct 284. The apparatus of FIG. 10 has the advantage that all exposed walls are covered by one of the foraminous collecting surfaces. This effectively prevents the walls of the chamber 260 from being covered with cakes of dried material sprayed from the nozzle 274.

Figure 12:
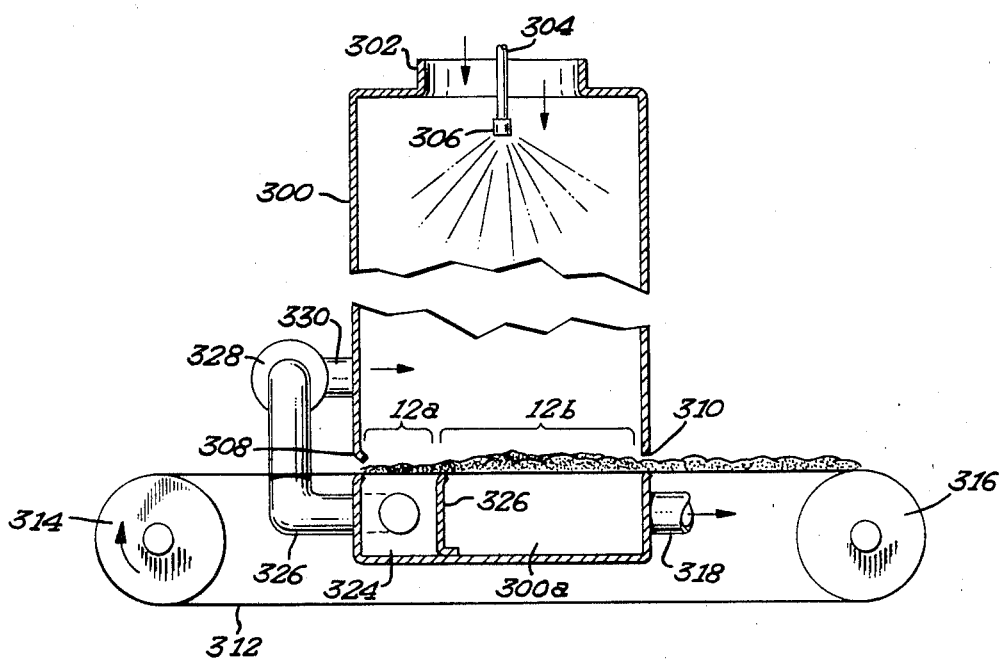
FIG. 12 is a modified form of the apparatus in accordance with the invention including another provision for pre-coating the collection screen.
Figure 15:
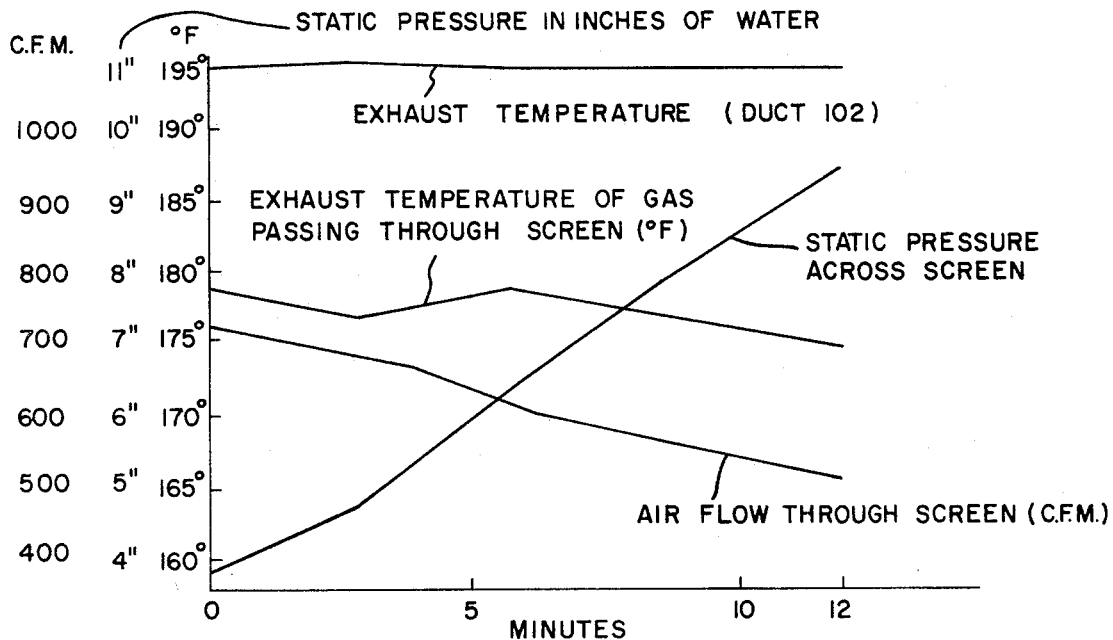
FIG. 15 is a graph illustrating the changes in processing conditions in connection with Example II.

It was found that under some operating circumstances and in the case of certain materials, there is a tendency for the dried or semi-dried particulate material to pass through the portions of the screen at the point where they enter the apparatus prior to the formation of a coating on the screen. In accordance with the modified forms of my invention illustrated in FIGS. 11 and 12, a means is provided for reliably preventing the passage of dried particulate material through the screen and out of the apparatus through the outlet duct which, if allowed to take place, would be wasteful and would create a dust problem. To prevent this occurrence, I provide a preliminary coating layer on the upstream surface of the collection screen prior to passing a drying gas through the screen and expelling the gas into the atmosphere. This can be accomplished in various ways. For example, an external supply of particulate material can be applied to the outside surface of the screen prior to passage into the drying apparatus. Alternatively, a portion of the material collected on the screen can be allowed to remain at all times on the surface of the screen thereby providing a permanent preliminary coating layer. Two other alternative means for accomplishing this objective are described in connection with FIGS. 11 and 12 to which reference will now be made.

FIG. 11 shows a modified form of the invention including a provision for coating the collection screen with a predetermined thickness of the material that is to be dried prior to the passage of the drying gas through the screen and into the atmosphere. There is provided a drying enclosure or housing 300 including side, top and bottom walls, an inlet duct 302 through which a drying gas such as heated air is introduced, a duct 304 for supplying a moist material which is to be dried to a nozzle 306 positioned at the upward end of the housing 300 in the center of the duct 302. The housing 300 includes orizontally disposed and laterally spaced openings 308 and 310 through which passes a suitable foraminous member such as an endless woven foraminous screen 312 entrained over a pair of horizontally spaced parallel and laterally extending drive rolls 314 and 316, each suitably journalled for rotation and driven in given feed directions for advancing the screen through the housing 300.

Below a portion of the screen 312 within the housing 300 is a chamber designated 300*a* that defines an outlet plenum which receives the drying gas after it is passed through the screen 312. The drying gas within the chamber 300*a* is exhausted through a duct 318 connected to the inlet of a suitable blower (not shown). Below the first portion of the screen 312 entering the slot 308 is a blocking plate 320 which will ordinarily rest in engagement with the lower surface of the screen 312 or closely adjacent thereto. A portion of the plate 320 can extend out of the apparatus through the slot 308. The plate 320 is preferably slidably mounted within the slot 308 for movement toward either the left or right as seen in FIG. 11 so that the area of the plate 320 underlying a portion of the screen 312 within the housing 300 can be controlled as desired. A handle 322 is provided for permitting manual adjustments to be easily made.

During operation of the apparatus illustrated in FIG. 11, the droplets sprayed from the nozzle 306 will be carried downwardly by the air passing through duct 302 toward the bottom of the housing. When the operation is started, the rolls 314 and 316 are turned in given feed directions thereby advancing the screen 312 toward the right through the housing. The particles will become tacky as moisture is removed from them as they travel toward the lower end of the housing and will form a deposit on the upper surface of the screen 312. The particles which are either extremely small or have been dried to the point where they are no longer tacky may initially pass through the screen 312 and will be exhausted through duct 318. A deposit will, however, immediately begin to accumulate upon the upper surface of the screen 312 adjacent the plate 320 since substantially no air will be able to pass through that portion of the screen. This coating layer is designated 11*a* in FIG. 11. Because the layer 11*a* will be formed upon the screen prior to the time that the drying gas is allowed to flow through the screen, the loss of particulate material which would otherwise pass through the screen prior to the build-up of a coating layer is prevented.

Refer now to FIG. 12 which is similar to FIG. 11 and in which the same numbers have been used for corresponding parts except for the differences which will now be explained. As clearly seen in FIG. 12, no blocking plate has been employed. Instead, there is provided a collection chamber 324 defined by the side and bottom walls of the housing 300 and by a plate 326 which separates the chamber 324 from the chamber 300*a*. A duct 327 connects the chamber 324 to the inlet of a blower 328. The outlet of the blower 328 is in turn connected by means of duct 330 with the chamber 300 thereby recirculating gas from chamber 324 to the upper chamber of housing 300.

The operation of the apparatus illustrated in FIG. 12 will now be described. To begin the operation, the rolls 314 and 316 are driven in given feed directions to convey the upper reach of the screen 312 from left to right as seen in the figures so that it travels first over the chamber 324 and next over the chamber 300*a*. The sprayer 306 is then operated as described hereinabove such that the droplets are carried downward and partially dried in the stream of drying gas entering through the inlet 302. Partially dried particles will first contact the screen 312 in the section thereof above the chamber 324. Any particles which happen to pass through the screen at this point are recirculated through the duct 326, blower 328 and duct 330. The particles which remain on the screen form an initial coating layer or deposit designated 12*a*, the thickness of which can be controlled by the speed of the screen 312 and the characteristics of the blower 328 and by the other factors which will be apparent to those skilled in the art.

In this manner, a coating layer of semi-dried product designated 12*a* will be formed upon the upward surface of the collection screen 312 prior to the final deposit of the dried product thereon in the area designated 12*b*. In this manner, the product which initially passes through the screen will be recirculated to the drying chamber upstream of the collecting screen instead of being lost through the outlet duct 318.

The formation of the preliminary coating layer as described herein is highly effective in preventing the loss of dried products from the dryer. Moreover, the preliminary coating layers were found surprisingly porous and uniform in consistency.

Refer now to FIG. 14 which illustrates a modified form of the invention embodying an endless moving collecting element. The apparatus includes a nozzle 6 connected to a source of liquid to be dried by a duct 29. The liquid to be dried is expelled as a spray 31 into a drying chamber 33. At the lower end of the chamber 33 defined by walls is provided a pair of laterally spaced horizontally disposed rolls 35 over which is entrained a porous collecting element such as a woven screen 37. During operation, the heated drying gas enters the apparatus in the area of the nozzle 26, passes through the screen 37 and is exhausted through a duct 39. The screen is thus interposed between the air inlet and air outlet of the enclosure. The screen 37 is preferably driven in a direction of travel opposite the flow of material through the nozzle, i.e. from right to left in FIG. 2. It will be seen that the particles containing the greatest amount of moisture travel the greatest distance in the air and are therefore deposited furthest from the nozzle 26. They consequently are subjected to drying for a greater period of time as they travel toward the outlet of the machine on the screen. A greater number of relatively small particles will be deposited near the outlet of the machine and consequently dried for a shorter period of time.

A variety of measures can be taken to prevent the undesired depositions of material upon the walls of the dryer. For example, the walls of the dryer can be coated with a poorly adherent material sometimes referred to as a release composition. This composition should, of course, be compatible with the product being processed and in the event that the product is a food, it should have no toxic characteristics. One suitable material which may be mentioned by way of example is an acetylated monoglyceride such as the product sold under the trade name "Myvacet" by the Distillation Products Industries of New York. In the alternative, a foraminous or louvered liner can be provided within the drying chamber and a gas passed from the space between the liner and the outer portion of the chamber through the pores or louvers as the case may be into the interior of the dryer thereby preventing suspended particles from impinging against the walls. Other methods for preventing the deposition of particles on the wall of the dryer will be apparent to those skilled in the art.

I have found that in some instances, the mat formed in accordance with the invention contains relatively fine particles which are collected by autofiltration from the gaseous drying medium as the medium passes through the agglomerate. These fine particles may be adhesively bonded to the mat but in some cases owing to their relatively low moisture content are merely mechanically trapped in the agglomerate. Moreover, a dry pulverulent material can be introduced into the drying chamber and intermixed with the dispersed air entrained liquid particles and collected by autofiltration on the mat of agglomerated material. The pulverulent material can have either the same or different compositions from the liquid particles.

The invention will be better understood by reference to the following examples which illustrate the preparation of specific products in accordance with my invention.

EXAMPLE I

A yellow cake pre-mix was prepared and dried in accordance with the invention using the apparatus generally similar to that illustrated in FIGS. 5, 6 and 7. The mix consisted of 54 parts flour, 29 parts sucrose, 14 parts fat including both shortening and emulsifiers and 3% moisture by weight. The dry mix was added to water to produce a suspension consisting of 44.2% solids. Mixing was carried out in a high-speed mixer of the type known as an Oakes mixer and air was entrained in the feed stream at a pressure of 3800 p.s.i.g. The resulting aerated mixture had a density of 0.85 gm./cc. and when entrained air was removed from the mix, the density was 1.15 gms./cc. The viscosity of the aerated suspension at 125° F. was 1200 cp. The resulting suspension was heated and fed at a pressure of 3500 p.s.i.g. to the spray nozzle at which point the temperature was 124° F. The dry bulb temperature of the drying gas, fed to the dryer was maintained between 315° F. and 325° F. and the wet bulb temperature was less than 110° F. The air exhausted through the duct 102 (FIG. 5) had a temperature between about 190° F. and 200° F. The air exhausted through the duct 102 had a dew point of about 94° F. The amount of entering air estimated at the inlet was about 2500 c.f.m. The foraminous collecting screen 84 had an area of 2 square feet and consisted of a woven stainless steel screen formed from .150 inch round wire of 10 mesh/inch. The distance of the screen from the nozzle was 9 feet 3 inches.

In the first run, a dry friable highly porous agglomerated mass was deposited on the collecting screen having a moisture content when removed of 2.3% moisture by weight. By comparison, the product collected from the interior wall of the dryer had a moisture content of 2.6% by weight. All percentages given below will be represented in parts by weight.

A second run was conducted at a somewhat reduced exit temperature. In this run, a product was obtained on the collecting screen having a moisture content of 3.6%. The material collected on the wall of the dryer had a moisture content of 4.2%.

In the third run, a product was obtained on the screen having a moisture content of 1.4%. The corresponding product obtained on the interior wall of the dryer had a moisture content of 3.6%. In each of these three runs the product obtained on the screen was highly porous, foraminous and friable agglomerate or mat consisting of a multiplicity of microscopic spheroidal particles bonded together at their points of contact and having a multiplicity of interconnecting passages extending therethrough from the free surface thereof up to the screen and communicating through the screen with the portion of the dryer in the opposite side of the screen. The product was dry to the touch and could readily be either broken or otherwise subdivided into pieces of the required size or reduced to a fine powder as required.

EXAMPLE II

A cake mix having the composition described in Example I was dried in the same manner described therein except that the screen was coated with a preliminary layer of dried cake mix particles to a thickness of ¾ inch by reducing the air flow through the screen. Following the deposition of the pre-coating layer virtually no particulate material passed through the screen. Changes in the operating conditions which occurred during the formation of the foraminous agglomerate on the screen are represented graphically in FIG. 15. The run lasted for 12 minutes. The density of the product obtained from the screen was 0.19 gm./cc. and the moisture content was 1.6%. By way of comparison, the density of the material obtained from the walls of the dryer was 0.26 gm./cc. and had a moisture content of 2.4%. During the 12-minute run, it will be seen that while the exhaust temperature of the gas expelled through the duct 102 remained relatively high at approximately 193° F., the temperature of the gas passing through the screen and through the dried product remained at a much lower level and had a tendency to drop during the drying operation. This indicates the effectiveness of the invention in removing moisture from the material as it is collected and in lowering the temperature to which the dried particles are exposed thereby helping to prevent heat damage. The graph also shows that although there is a noticeable rise in the static pressure across the screen during operation as the mat continues to increase in thickness, there is nevertheless a relatively free passage of gas through the screen in the last stages of the run, in this case the rate being 550 c.f.m.

EXAMPLE III

Figure 16:
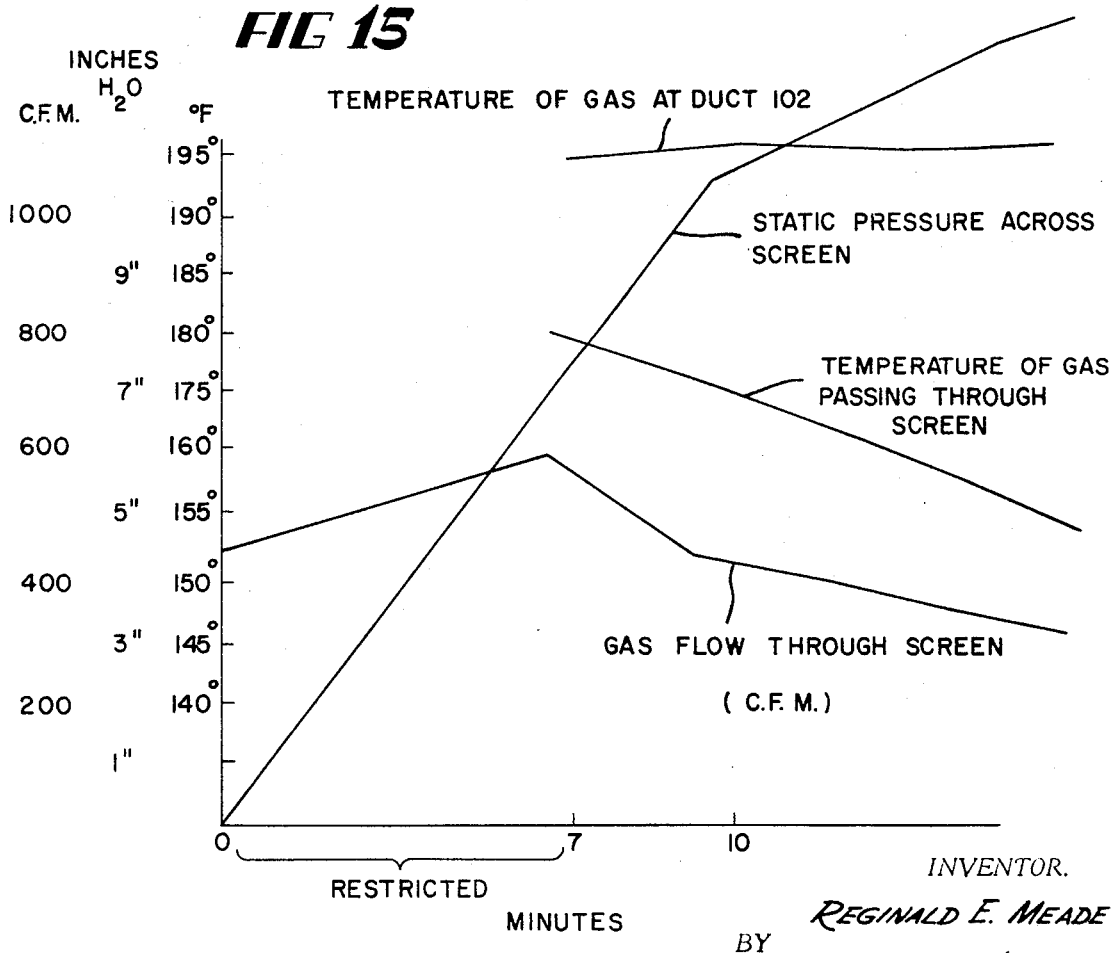
FIG. 16 is a graph illustrating changes in processing conditions in connection with Example III.

Another run was conducted with the cake mix product in the manner described in Example I, except that the initial velocity of the gas passing through the screen was reduced somewhat. The product obtained on the screen had a density of 0.20 gm./cc. The product obtained from the wall of the dryer on the other hand had a density of 0.26 gm./cc. The change in operating conditions which took place during the run are illustrated graphically in FIG. 16. During the initial start-up period of 7 minutes, the flow through the screen was reduced by partially closing the valve 106. During the initial 7-minute period, the flow through the screen increased from about 550 to about 600 cubic feet per minute. The effectiveness of the invention for removing moisture from the deposited material can be seen by referring to the temperature of the gas passing through the screen which dropped during operation from about 178° F. to about 152° F. at the end of the run. On the other hand, the outlet temperature of the gas passing through the duct 102 increased during operation from about 192° F. to about 194° F. At the end of the run, the flow through the screen was adequate (about 300 c.f.m.).

EXAMPLE IV

Another run was conducted in the manner set forth in Example I with the same cake mix composition. In the run, a 10-minute pre-coating operation was performed in which a coating layer was formed on the screen having a predetermined thickness of from about 1/8 inch to about 1/2 inch. The changes in operating conditions taking place in the course of the run can be clearly seen by reference to FIG. 17. During this run, the gas inlet temperature passing through duct 62 was about 320° F. At duct 102 it was about 195° F. The product obtained from the wall of the dryer had a moisture content of 3.3% while the product obtained on the screen had a moisture content of 1.5% thus demonstrating the effectiveness of the invention for obtaining relatively low moisture levels.

EXAMPLE V

Another run was conducted as set forth in Example I with the same cake mix composition except that no air was allowed to pass through the foraminous collecting screen by placing a metal plate adjacent to and abutting the downstream surface of the screen. A coating of material was thus built on the screen which had no air flowing through it. During this run, the moisture content of the material collected on the walls of the dryer was 1.8% whereas the moisture content of the material collected on the sealed screen was 2.9%. It can, therefore, be seen that while the moisture content of the material collected on the screen is almost twice the moisture content of the material collected on the walls of the dryer, by comparison with Example IV, it will be seen that the moisture content of the material on the screen will be substantially less rather than greater than the moisture content of the material allowed to collect on the walls of the apparatus when gas is allowed to pass through the agglomerate. This demonstrates the efficiency with which the invention is capable of drying materials.

EXAMPLE VI

A flour-water slurry was dried in generally the same manner set forth in Example I, except that flour was employed in place of the cake mix composition disclosed. In this instance, the air inlet temperature was 325° F. The temperature of the air exhausted through duct 102 was approximately 185° F. In the course of the operation, a highly porous friable agglomerate was collected upon the foraminous screen. The moisture content of the agglomerate was 5.6%. By comparison, the material which had collected upon the walls of the dryer was 11.2%.

In a second run with the inlet air temperature changed to 330° F. and the temperature of the drying gas passing through duct 102 at 155° F., the resulting agglomerate collected upon the screen was 6.3%. By comparison, the material which collected upon the interior walls of the dryer was 29.7%.

EXAMPLE VII

A slurry was made from a mixture consisting of 40% non-fat dry milk solids and 60% water. The resulting mixture was sprayed into the dryer in the manner described in connection with Example I, with the temperature of the air leaving the dryer through duct 102 on the order of about 150° F. A dry, porous agglomerate having a friable character including a multiplicity of microscopic pores extending between the adhered particles was collected upon the foraminous screen. The resulting agglomerate had a moisture content of 5.7%. The material collected upon the walls of the dryer itself had a moisture content of 7.3%.

A second run was conducted with the same material but at a solids content of 50% by weight. In this instance, the air passing through the duct 102 was at a temperature of about 153° F. The moisture content of the material collected upon the screen was 4.4%. The moisture content of the material collected on the wall of the dryer was 7.5%. Solubility indices determined conventionally for concentrated skim milk used to produce the sample and on the dried sample indicated that solubility of the dried sample from the screen was not impaired.

EXAMPLE VIII

A supersaturated solution of lactose was prepared with a small portion of the lactose present in a crystalline form in the slurry. The saturated solution was passed through the spray nozzle into the dryer in the general manner described in Example I, except that the inlet air was controlled to maintain the air passing out through the duct 102 at a temperature of 130° F. A highly porous, friable agglomerate was collected upon the screen having a moisture content of 4.2%. The moisture content of the material collected upon the walls of the dryer was 3.6%.

In a second run, a dilute solution of lactose was sprayed into the drying chamber in the manner described in connection with FIG. 1, with the drying air maintained at a temperature sufficient to hold the air passing through the duct 102 at 190° F. The resulting porous agglomerate collected upon the screen had a moisture content of 1.2%. The moisture content of the material collected upon the wall of the dryer was 1.4%. The higher moisture content of the product collected in the first run is believed to indicate the presence of lactose in the monohydrate form in which a mole of water is present for each mole of lactose. The fact that the moisture content of the product obtained in the second run was less than that collected on the wall of the dryer is believed to indicate the presence of lactose in the amorphous form. The results obtained in these two runs indicate the effectiveness of the invention for controlling the characteristics of the end product and the ability of the invention to produce either amorphous lactose or lactose in the monohydrate form by varying process conditions.

EXAMPLE IX

A dried whey product was mixed with water to form a slurry having a moisture content of 50% by weight. This material was sprayed as described in Example I using a fine spray nozzle. The temperature of the air passing through duct 102 was held at about 150° F. The resulting agglomerate collected upon the screen had a moisture content of 3.0% by weight. The material collected on the wall of the dryer had a moisture content of 3.7%. The moisture content of the dry product which passed through duct 102 was 3.3%.

Another run was conducted using a spray head adapted to produce a coarse spray. The temperature of the outlet gas was held below 150° F. The resulting agglomerate collected upon the screen had a moisture content of 5.9% and the material on the walls of the dryer had a moisture content of 18.0%.

EXAMPLE X

Sodium caseinate was made up into a solution having a solids content of 20%. The material was sprayed into the dryer in the manner described in Example I with the temperature of the drying gas passing through duct 102 held at around 160° F. A coarse spray nozzle was used. The resulting agglomerate collected upon the screen had a moisture content of 5.2%. The product obtained on the walls had a moisture content of 20.0%. The product passing through duct 102 had a moisture content of 8.8%. The products obtained from the screen in Examples IX and X could be crushed to form a free-flowing powder after cooling whereas the product on the walls was in the form of a homogeneous paste or film.

EXAMPLE IX

Three parts of a shortening were mixed with eight parts water and one part non-fat milk solids to form a slurry composed of 33% solids by weight and introduced into the dryer in the manner described in Example I with the air passing through the duct 102 maintained at 160° F. The resulting spray dried agglomerate collected upon the screen of the dryer had a moisture content of 0.50%. By comparison, the agglomerate collected upon the walls of the dryer had a moisture content of 1.20%.

The invention as it applies to the agglomeration of dried powders will now be described. In this application of the invention, since there is no liquid suspension to be dried, the dispersing means therefor is eliminated. The agglomeration process is begun with pulverulent solid which includes as a component a material that exhibits a certain amount of surface tack or adhesion when heated or when exposed to a liquid hereinafter referred to as "an activating liquid." Examples of such solids are foods such as dried powdered vegetable and fruit juices, milk, sugar, flour or powdered chemicals any of a variety of materials, such as pure elements, salts, resinous materials and in general a pulverulent material which when exposed to a liquid will become tacky enough to bond to itself. A second starting material consists of the activating liquid. While this usually comprises water, it can also consist of other polar or non-polar liquids depending upon the material being agglomerated. An additional starting agency comprises a gaseous drying atmosphere. The drying atmosphere will normally consist of air heated above room temperature and containing moisture substantially below its saturation point. The term "drying atmosphere" as used herein is intended to mean at such conditions of temperature, pressure and vapor content as to be capable of holding a substantial quantity of the activating liquid.

As a first step in the operation, the solid to be dried is suspended in the drying atmosphere as by introducing it to the apparatus with an air stream. The activating liquid is also introduced into the drying atmosphere as droplets small enough so that the liquid portion of the droplets will readily contact and mix with the solids. For most practical applications of the invention, it is preferred that the droplets be smaller than approximately 150 microns in diameter. Generally, the smaller the diameter of the droplets, other things remaining equal, the more rapidly will moisture be removed.

Next, the drying atmosphere together with the suspended moistened particulate material is passed through a foraminous collecting member. As the drying atmosphere passes through the foraminous member, the suspended particulate material is collected upon the foraminous member as well as and upon the particulate material which has already been deposited on the foraminous member while the surfaces of the particles are still in a tacky condition but do not contain sufficient liquid to enable them to coalesce and form a relatively solid material. By the term "coalesce" as used herein I mean a flowing or fusing together of the particles to form a relatively solid hard material in which the individual particles cannot be clearly recognized and wherein the spaces or interstices between them are relatively small (if present at all) relative to the size of the particles. The particles are thus brought together so as to contact one another while the surfaces thereof are in a tacky condition so that bonds are formed between the points of contact of the particles to produce relatively highly porous lacy reticulum in which a fairly high percentage of the agglomerate thus formed consists of empty spaces between the contacting and bonded particles. The flow of drying atmosphere through the bonded particles continues until the remaining moisture or other liquid present on the surfaces of the particles is removed and the particles are thereby firmly bonded to one another at their points of contact. In this way a deposit of bonded particles builds up in situ upon the foraminous member with the drying atmosphere passing through the deposit to dry it. The particles which have been deposited upon the foraminous member serve as a means for collecting freshly deposited particles. When particles are collected and agglomerated in situ as described I discovered that a tightly packed or blinded condition on the collection screen is prevented and accordingly the flow of the drying atmosphere through and around the material deposited on the screen will continue without interruption. When the agglomerating operation is finished and the mat formed on the screen is completely dried it can be removed from the screen in any suitable manner. It is then preferably reduced to form agglomerate pieces of a predetermined size, often from 1/32 to 1/4 inch in diameter. This can be accomplished by passing the mat through conventional sizing rolls (not shown).

Briefly, the apparatus in accordance with a preferred form of the invention includes a first area or zone into which is introduced a heated gaseous drying medium together with the suspended solids to be agglomerated together with an atomized activating liquid. This zone is provided with a foraminous surface which is preferably mobile arranged so that a minimum of the product is retained upon the walls of the drying chamber. The foraminous surface is constructed to permit passage of the gas through itself while most of the solid particles entrained in said heated gas is deposited on the inner side thereof thus separating the particles from the gaseous medium.

The particles accumulate on the surface while tacky until a predetermined desired thickness is reached to produce a highly porous network of bonded particles to form a friable solid accretion or agglomerate containing voids sufficient to permit passage of the gas therethrough but acting as a filter bed for additional entrained particles. In a preferred form of the invention a provision is made for causing the mobile collecting surface together with the bed of agglomerated particles to move out of the first drying area or zone to another area or zone wherein said heated and relatively humid drying gas is prevented from contacting the porous bed or perforated surface. There the porous accretion is further treated or dried and preferably cooled sufficiently to facilitate its removal. The pieces that are removed are then reduced to the desired size often between 1/4 and 1/8 inch in diameter as by screening or by passage through reducing rolls. Finally, the mobile perforate surface is returned to the original drying zone with or without a portion of the previously dried material.

The apparatus employed can be identical to that described above except that the spray nozzles will, of course, supply a liquid having little or no solids content rather than a solution or slurry.

During operation, the material to be agglomerated mixes with the spray and collects on the screen as a highly porous agglomerate. The particles that form the agglomerate have sufficient initial moisture during falling rate period to permit migration of soluble components while the product is maintained at a desired temperature for a desired period of time. This results in better surface wetting and more rapid solubility of the finished agglomerate when it is placed in water. The control of total drying time permits drying to desired moisture levels at relatively low temperatures if desired when temperature-sensitive materials are being processed.

The appearance of large pieces of agglomerate removed from the screen and before size reduction bears the impression of the screen surface. If the material is relatively tacky at the time it was deposited, marked striations and channels normal to the influent and effluent surfaces will be present. In general, if the material contains less moisture or is only slightly tacky, it will have an irregular surface with no visible striations or markings.

Any of a variety of activating liquids can be employed. While the liquid will ordinarily consist of water, it can alseo comprise a non-polar liquid such as an organic solvent. Where the material being agglomerated consists of a food product such as a bakery mix product, dried vegetable fruit juice or dried milk, the activating liquid will ordinarily be water. Where chemical materials are being processed, a non-polar organic solvent such as a hydrocarbon liquid or other petroleum derivative, aldehyde, ketone or other solvent known to the art can be employed.

The pulverulent solid material con comprise any of a variety of particulated insoluble or soluble materials capable of being dried. They can comprise, for example, dissolved solids which form true solutions, colloidal or non-colloidal suspensions. The term "solids" as used herein also includes suspended materials which sometimes exist as a liquid, for example, powdered fat in the case of dairy products.

It is apparent that many modifications and variations of this invention as hereinbefore set forth may be without departing from the spirit and scope thereof. The specific embodiments described are given by way of example only and the invention is limited only by the terms of the appended claims.

I claim:

1. A process for drying fluids containing liquid and solid components within a drying chamber having at least one outlet for drying atmosphere comprising:
   (a) providing a drying atmosphere;
   (b) providing a foraminous collecting member within the drying chamber, said foraminous member extending entirely across said one outlet to thereby separate said one outlet from the chamber such that essentially all of that portion of the drying atmosphere passing from the chamber through said one outlet flows through the foraminous member;
   (c) dispersing minute droplets of the fluid in the drying atmosphere;
   (d) establishing a pressure drop across the foraminous collecting member to thereby force said portion of the drying atmosphere through said foraminous collecting member;
   (e) while allowing the droplets to partially dry to the point where the surfaces are in a tacky condition by the time the droplets reach said foraminous collecting member;
   (f) said tacky droplets being thereby collected on the foraminous member as a porous, lacy mat characterized by the ability to allow further drying atmosphere to pass therethrough;
   (g) continuing to pass drying atmosphere through said mat until the desired degree of dryness is reached and
- (h) removing said mat from said foraminous member.

2. The process according to claim 1 wherein the entire drying atmosphere is passed through the foraminous collecting member.

3. The process according to claim 1 wherein the drying atmosphere comprises heated air.

4. The process according to claim 1 wherein said collecting member is moved during the operation of said process and said mat is continuously removed from the screen to continuously provide a fresh collection surface for receiving said partially dried droplets.

5. The process according to claim 4 wherein said mat in said screen is moved to a cooling zone and said mat is refrigerated within said cooling zone.

6. The process according to claim 1 wherein a preliminary coating layer is applied to said foraminous collecting member to prevent the passage of particles therethrough when the process is started, said preliminary coating layer comprising a plurality of particles bonded together at their points of contact and having a multiplicity of pores extending therethrough.

7. The process of claim 1 wherein said mat is comminuted to the desired degree of fineness following the removal thereof from said foraminous collecting member to provide a multiplicity of agglomerated bodies having a relatively small size in comparison to the mat and having predetermined dimensions.

8. The method according to claim 1 wherein the drying atmosphere comprises air heated to a temperature of at least 100° F.

9. The process according to claim 1 wherein the fluid to be dried comprises a food product and said drying atmosphere comprises air heated to a temperature between about 100° F. and 500° F.

10. A method of producing a porous agglomerated product comprising:
- (a) providing an activating liquid,
- (b) providing pulverulent solids to be agglomerated,
- (c) providing a drying atmosphere and
- (d) providing a foraminous collecting member,
- (e) suspending the solids in the drying atmosphere,
- (f) exposing the solids to said liquid,
- (g) causing the drying atmosphere to pass through said foraminous member to collect the particles on the foraminous member while tacky but without sufficient liquid present to cause the particles to coalesce,
- (h) continuing to force the drying atmosphere through the collected particles until an agglomerated mass is formed in situ on the surface of the foraminous collecting member and
- (i) thereafter removing the agglomerate from the foraminous member.

11. The process of claim 10 wherein the finished agglomerate is reduced in size to form agglomerate bodies having predetermined dimensions.

12. The process of claim 10 wherein a relatively cool, dry gas is passed through the agglomerate upon the collecting medium to render it substantially dry to the touch.

13. The method of claim 10 for producing at least a superficially dry highly permeable agglomerated food product comprising:
- (a) providing food solids to be dried in pulverulent form,
- (b) providing an activating liquid comprising water,
- (c) spraying the liquid into the drying medium to tackify the suspended food solids,
- (d) causing the gaseous drying medium to pass through the foraminous collecting medium while the food particles are in a gummy or tacky condition whereby the tacky surfaces of the particles contact one another to form mechanical bonds at the points of contact only between their partially dried surfaces and (e) forcing at least a substantial fraction of the drying medium thorugh the agglomerate deposited upon the foraminous collecting member to dry the food agglomerate deposited thereon and to filter minute substantially dry food particles from the gaseous drying medium.

14. The method according to claim 13 in which the agglomerate formed on the foraminous collecting member is cooled before being removed therefrom.

15. The method according to claim 10 in which the agglomerate formed on the foraminous collecting member is cooled before being removed therefrom.

16. The process according to claim 10 wherein cooling is carried out by passing a chilled gas through the agglomerate present on the foraminous collecting medium until the temperature thereof has been substantially reduced to render said product stable and non-tacky.

17. The process according to claim 1 wherein the mat is exposed to electrogamnetic microwave radiation sufficient to evaporate a significant fraction of the liquid present in the mat.

References Cited

UNITED STATES PATENTS

| | | | |
|---|---|---|---|
| 1,871,878 | 8/1932 | Cahoon et al. | 210—193 |
| 1,942,868 | 1/1934 | Mitchell. | |
| 2,085,691 | 6/1937 | Brown. | |
| 2,350,934 | 6/1944 | Shutte. | |
| 2,614,134 | 10/1952 | Powers | 210—68 XR |
| 2,652,152 | 9/1953 | Frankenhoff | 210—75 |
| 2,730,933 | 1/1956 | Reynolds | 210—68 XR |
| 3,129,131 | 4/1964 | Henszey. | |

FOREIGN PATENTS 185,725  1/1924  Great Britain.

FREDERICK L. MATTESON, JR., Primary Examiner

H. B. RAMAY, Assistant Examiner

U.S. Cl. X.R.
159—4, 48